United States Patent [19]

Matsumoto

[11] Patent Number: 5,249,264
[45] Date of Patent: Sep. 28, 1993

[54] IMAGE DISPLAY METHOD AND APPARATUS

[75] Inventor: Takashi Matsumoto, Tokyo, Japan

[73] Assignee: International Business Machines Corporation, Armonk, N.Y.

[21] Appl. No.: 876,815

[22] Filed: Apr. 29, 1992

Related U.S. Application Data

[63] Continuation of Ser. No. 435,844, Nov. 13, 1989, abandoned.

[30] Foreign Application Priority Data

Nov. 14, 1988 [JP] Japan .................. 63-285698

[51] Int. Cl.⁵ .................................... G06F 15/72
[52] U.S. Cl. .................................... 395/134; 395/133; 395/121; 395/122; 345/133
[58] Field of Search .............. 364/518, 521, 522, 747, 364/750; 395/133, 134, 162, 164, 121, 122

[56] References Cited

U.S. PATENT DOCUMENTS

| | | | |
|---|---|---|---|
| 4,907,174 | 3/1990 | Priem | 364/521 |
| 4,924,415 | 5/1990 | Winser | 364/522 |
| 4,945,500 | 7/1990 | Deering | 364/522 |
| 4,951,232 | 8/1990 | Hannah | 364/522 |

Primary Examiner—Phu K. Nguyen
Attorney, Agent, or Firm—William A. Kinnaman, Jr.

[57] ABSTRACT

An image display apparatus in which respective L-buffers each store a depth value of a position on a front boundary surface of a clipping region, while respective Z-buffers each store a depth value of a position on a back boundary surface of the clipping region. A depth value is generated at each position on an object to be displayed in connection with a pixel position on the screen and is compared with the corresponding depth values in the L- and Z-buffers. A determination of whether each position on the object to be displayed exists in the clipping area is made in accordance with the results of the comparison with the buffer contacts.

8 Claims, 8 Drawing Sheets

LINE SEGMENTS AE, EF AND EH ARE ACTUALLY INVISIBLE
FBP : ▱ABCD, ▱BCGH, ▱CDHG
BBP : ▱ABFE, ▱EFGH, ▱ADHE

FIRST TIME

OBJECTS IN THIS EMBEDDING ACCEPTOR ART DRAWN.

SECOND TIME  EMBEDDING PORTION IS CUT OUT OF THE MODEL INCLUDING THE EMBEDDING PORTION AND SYNTHESIZED.

THIRD TIME

OBJECTS IN THIS EMBEDDING ACCEPTOR ARE DRAWN AND SYNTHESIZED.

IMAGE DISPLAY METHOD AND APPARATUS

CROSS-REFERENCE TO RELATED APPLICATION

This application is a continuation of application Ser. No. 07/435,844, filed Nov. 13, 1989, now abandoned.

BACKGROUND OF THE INVENTION

1. Field of the Invention

This invention relates to an image display method and apparatus and, more particularly, to a method and apparatus that can perform clipping for any three-dimensional region with a simple configuration at a high speed.

2. Description of the Related Art

Various techniques have been used for two-dimensional clipping to date. Because three-dimensional data has generally been used for CAD (computer-aided design) and CG (computer graphics) in recent years, clipping for three-dimensional regions has been important to eliminate unnecessary data and image processing. Several techniques have been developed for three-dimensional clipping. However, it is difficult to implement these techniques with hardware and to perform them at a high speed because they cannot realize the processing for each pixel. That is, because recent high-speed three-dimensional image display units have high-speed hardware to convert polygons into data for each pixel, a technique is needed to simultaneously perform the clipping for the three-dimensional region on such hardware. However, the prior art techniques do not meet the above requirements. For example, there is a technique called the Cyrus-Beck algorithm for clipping to any convex three-dimensional region. The Cyrus-Beck algorithm clips line segments using the inward normal line on the boundary surface of the region. To execute clipping with the technique when a polygon is developed into pixels, it is necessary to calculate the inner product by referencing every inward normal line on the boundary surface for each pixel. However, this is too complex a calculation for each pixel to implement with hardware.

For details of the Cyrus-Beck algorithm and other techniques, see, for example, the chapter on clipping in "Procedural Elements For Computer Graphics" by David F. Rogers, published by the McGraw-Hill Book Company in 1985.

An object of this invention is to provide an image display method and apparatus that provide three-dimensional clipping at a high speed by simple processing for each pixel and are capable of generating images.

SUMMARY OF THE INVENTION

To attain the above object, the invention develops and extends to the clipping the so-called Z-buffer method (depth buffer method), wherein a depth value is developed for each pixel over surfaces constituting an object to be displayed, and then an image is generated while removing hidden surfaces with reference to the depth values. That is, several buffers are provided to store the depth values for each pixel on the screen. Then, the depth values on the boundary surfaces of the clipping area are developed by the same procedure as that for developing the values on the surfaces constituting the object to be displayed, and stored in these buffers. Then the object to be displayed is developed into data for each pixel, and it is determined whether the data is for the object in the clipping region using the depth values of the boundary surfaces in the buffers. If the data is for an object in the region, then it may be actually displayed on the screen, and therefore it is decided whether or not to display the data on the screen after further removing hidden surfaces. If the data is for an object out of the region, the data is discarded because the data for the pixel cannot be displayed on the screen. By repeating the above processing for each object and each pixel, an image provided with three-dimensional clipping is generated.

DESCRIPTION OF THE PREFERRED EMBODIMENT

Figure 1:
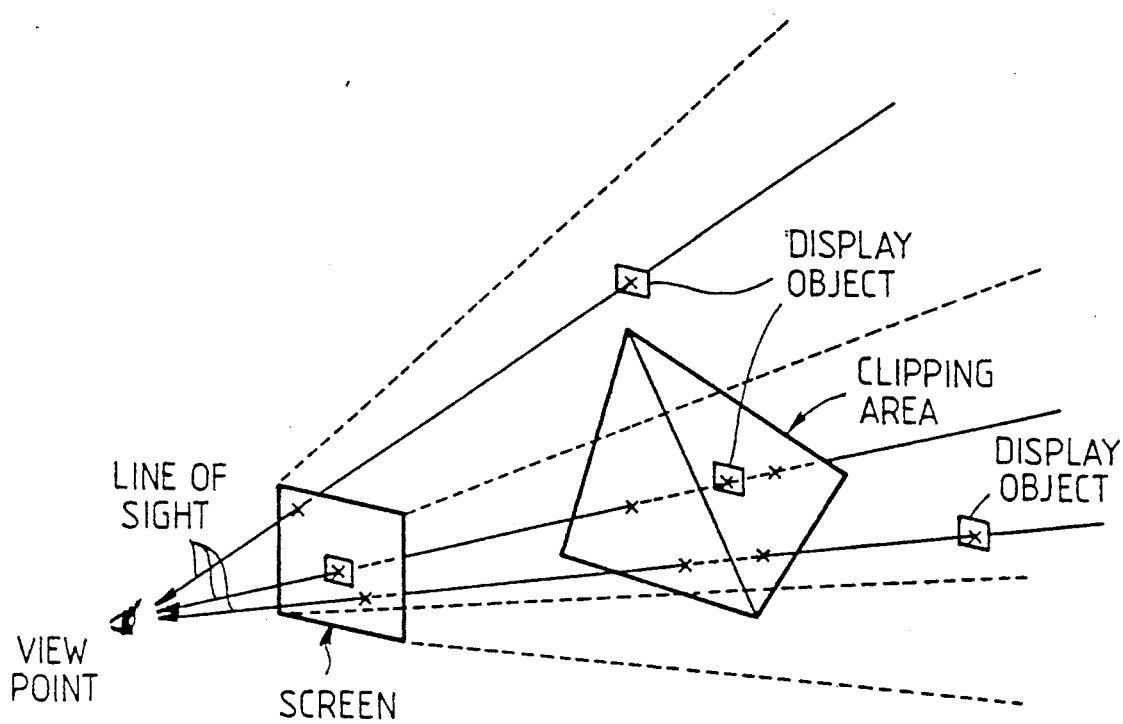
FIGS. 1 and 2 are perspective views explaining the principle of this invention.

An embodiment of the invention will be explained by referring to the drawings. In the following embodiment, the clipping is limited to that for any convex three-dimensional region in view of practicability, and the number of buffers 10 for each pixel is also minimized to effectively harmonize with the hidden surface removal method based on the Z-buffer method. However, unless the number of buffers for each pixel is limited, clipping for any three-dimensional region including a concave region is possible. Similarly, as in conventional high-speed image display units, a curved surface can approximated with several polygons.

1. Clipping-Region Discriminating Condition

Referring to FIG. 1, a line of sight generally either intersects the boundary of the three-dimensional convex clipping region ("clipping area" in the drawings) twice or does not intersect it at all. Here, the boundary is not included in the region. When a point on a display object (hereinafter simply "object") is in the clipping region and is actually projected to a pixel on the screen, the line of sight passing through the pixel intersects the boundary of the clipping region twice and the depth value at the projected point must range between the depth values of the two intersections.

Figure 2:
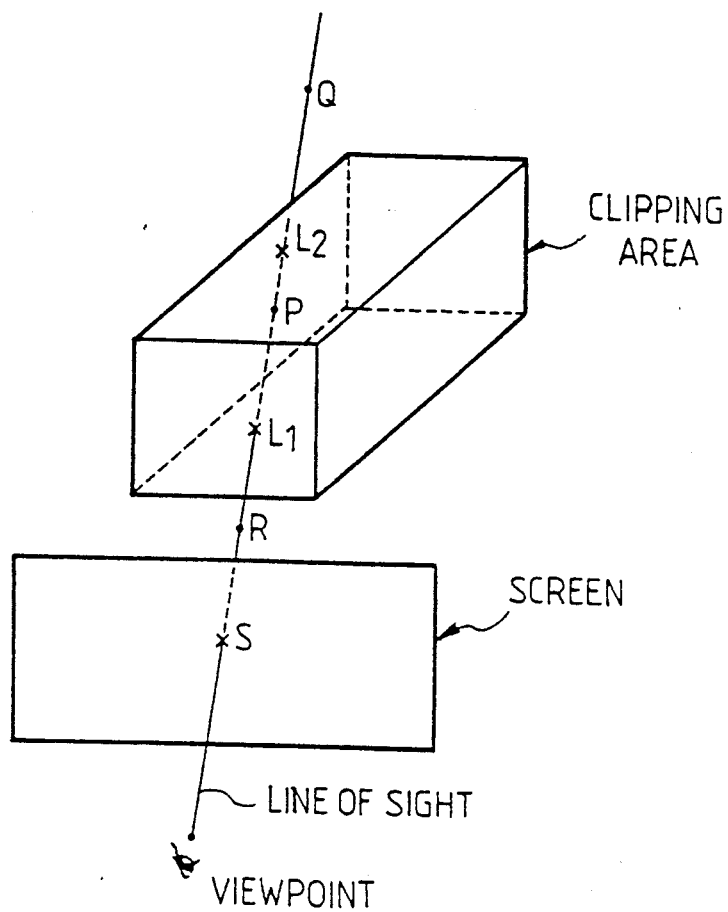

The following explanation is made using a more detailed example, shown in FIG. 2. Assume that the rectangular solid shown in the figure is a clipping region, that only objects in the region are displayed, and that the point P on the object is projected to the point S on the screen. When the depth values ZL1 and ZL2 for L1 and L2 (the two intersections of the surface of the rectangular clipping region with the line of sight passing through the point S) are previously obtained from the pixel at the point S and held, it is sufficient to display only the point P (where the condition "ZL1<Z-P<ZL2" is effected by assuming the depth value at the point P as ZP) on the screen. Therefore, the points Q and R in FIG. 2 are not displayed because they do not meet the above condition. Note that the smaller depth value indicates the sides nearer to the front hereinafter.

2. Clipping Technique

Figures 3A, 3B:
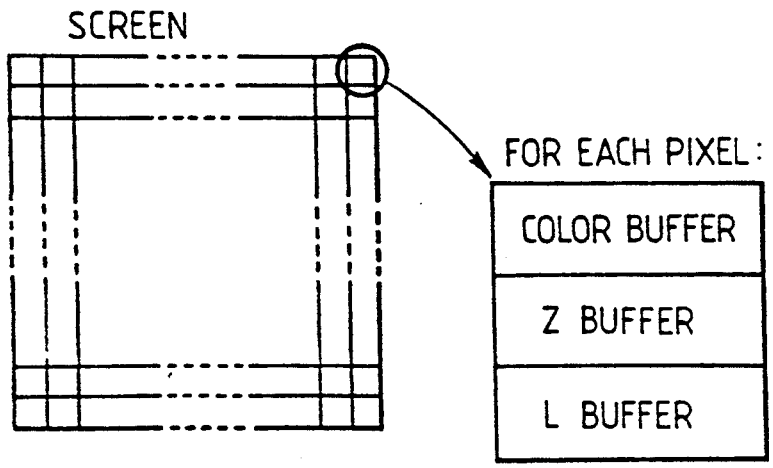
FIG. 3 is a schematic block diagram showing a buffer configuration for each pixel used for the embodiment.

To perform clipping according to the above section, two buffers to store depth values for each pixel are needed for ZL1 and ZL2. In this case, the buffer for the rear point, or the buffer corresponding to ZL2, can be shared with the conventional Z-buffer for removing hidden surfaces and lines. Therefore, a buffer to store a depth value corresponding to ZL1 is provided for each pixel, which is called the "L buffer" (limit Z buffer). Thus, each pixel has a color buffer, a Z-buffer and an L-buffer (see FIG. 3). Two types of the clipping techniques are described in the following paragraphs. The first technique minimizes the amount of calculation, while the second technique allows clipping to be performed for a common region when several clipping regions are used.

a. First Clipping Technique

Figure 4:
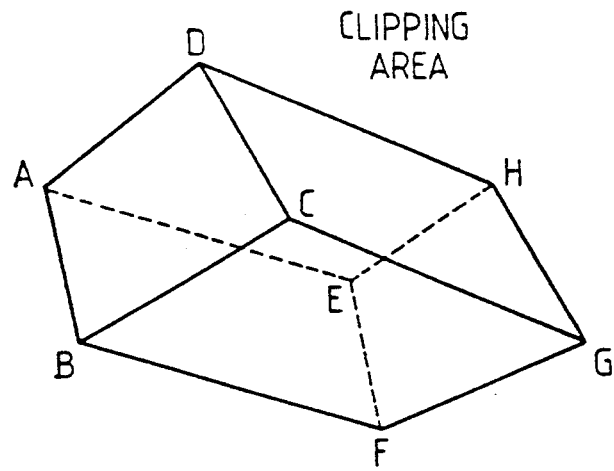
FIG. 4 is a perspective view illustrating the FBP and BBP.

The procedure for the first clipping technique is as follows:

(1) Boundary surfaces of the clipping region are classified into visible boundary surfaces, which are nearer to the viewpoint (also referred to herein as Front-facing Boundary Polygons or FBPs), and invisible boundary surfaces, which are farther from the viewpoint (also referred to herein as Back-facing Boundary Polygons or BBPs). This is explained in more detail with reference to FIG. 4. The interior of a hexahedron ABCDEFGH can be assumed to be a clipping region and the hexahedron is seen as shown in FIG. 4 when it is displayed on a screen. The dotted lines in FIG. 4 represent the back of the region, which is not actually displayed. In this case, quadrangles ABCD, BCGF, and CDHG are regarded as the FBPs, and quadrangles ABFE, EFGH, and ADHE as the BBPs.

(2) For all pixels, the color, Z- and L-buffers are initialized with appropriate values. For example, the color buffers are initialized with the background color, the Z-buffers with the farthest point values, and the L-buffers with the nearest point values.

(3) All polygons for the FBPs are developed into data for each pixel by the polygon development method normally used for the Z-buffer method. In this case, the color and Z-buffers are not changed, but the L-buffer value for a pixel is updated to the FBP depth value for the pixel if the depth value represents a farther position than the present L-buffer value. Similarly, all polygons for the BBPs are developed into data for each pixel. In this case, the color and L-buffers are not changed but the Z-buffer value for a pixel is updated to the BBP depth value for the pixel of the depth value represents a nearer position than the present Z-buffer value.

(4) All objects to be displayed (polygons, straight lines, and points) are developed into data for each pixel using the same method as that used for development of polygons for the FBPs and BBPs. In this case, the L-buffer values are not changed but the color and Z-buffer values for a pixel are changed to the newly developed values if the following three conditions are established for the pixel:

a) The developed depth value represents a nearer position than the value held in the Z-buffer.
b) The developed depth value represents a farther position than the value held in the L-buffer.
c) The pixel was accessed at least once when the polygons for the FBPs and BBPs were developed. In other words, it was a processing object.

In this first technique, the clipping is considered for the region made by combining several clipping regions. If the clipping region is a single convex polyhedral region, new depth values can be stored without comparison with the present values of the L- or Z-buffer when the polygons for the FBPs or BBPs are developed in the above step 3. To check condition c in step 4, the processing made for each pixel is stored in step 3. Therefore, in practice, a one-bit flag is provided for each pixel.

b. Second Clipping Technique

The procedure for the second clipping technique is as follows:

(1) The boundary surfaces of the clipping region are classified into visible boundary surfaces, which are nearer to the viewpoint (FBPs), and invisible boundary surfaces, which are farther from the viewpoint (BBPs).

Figure 5:
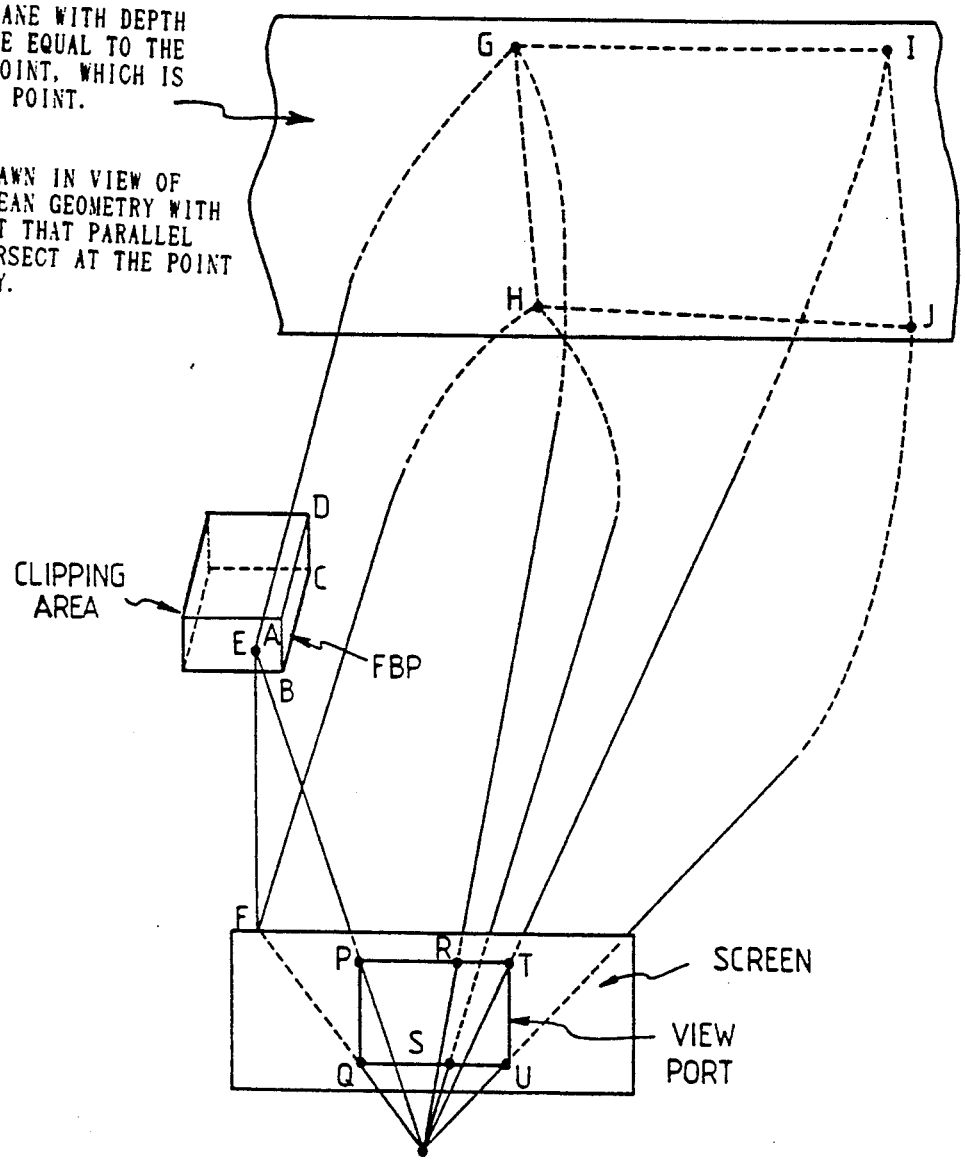
FIG. 5 is a perspective view illustrating the EFBP and EBBP.

(2) The FBPs and BBPs are expanded as follows. For each FBP, the whole screen or a view port, if it is on the screen, is inversely projected onto the plane including the objective FBP to obtain its image as an "EFBP" (Extended Front-facing Boundary Polygon). In this case, portions that cannot be projected may exist on the screen or view port because the line of sight for inverse projection and the plane including the FBP have no intersection on the screen side of the viewpoint. If so, the portion of the screen or view port that cannot be projected is considered to have an EFBP of the farthest depth value, and finally two sheets of EFBPs are made from one sheet of FBP (see FIG. 5). Similarly, the EBBP (Extended Back-facing Boundary Polygon) is obtained from all BBPs.

(3) For all pixels, the color, Z- and L-buffers are initialized with appropriate values. For example, the color buffers are initialized with the background color, the Z-buffers with the farthest values, and the L-buffers with the nearest values.

(4) Polygons for all the EFBPs are developed into data for each pixel with the polygon development method normally used for the Z-buffer method. In this case, the color and Z-buffers are not changed, but the L-buffer value for a pixel is updated to the EFBP depth value for the pixel if the depth value represents a farther position than the present L-buffer value. Similarly, polygons for all the EBBPs are developed into data for each pixel. In this case, the color and L-buffers are not changed, but the Z-buffer value for a pixel is updated to the EBBP depth value for the pixel if the depth value represents a nearer position than the present Z-buffer value.

(5) All objects to be displayed (polygons, straight lines, and points) are developed into data for each pixel using the same method as that used for development of polygons for the EFBPs and EBBPs. In this case, the L-buffer values are not changed, but the color and Z-buffer values for a pixel are updated to the newly developed values if the following two conditions are satisfied for the pixel:

a) The developed depth value represents a nearer position than the value held in the Z-buffer.
b) The developed depth value represents a farther position than the value held in the L-buffer.

3. Expansion of Technique

The basic techniques for clipping into a convex three-dimensional polyhedral region were described in the previous section. View port clipping for the view port on the screen, clipping out of convex three-dimensional regions, and three-dimensional synthesis of images by applying the clipping can be attained by only slightly modifying the above basic techniques. The technique expansion method for application will be described hereinafter.

a. View Port Clipping

When the Z- and L-buffers are initialized in either of the first and second techniques, all pixels outside the view port are initialized so that the Z-buffer depth values represent nearer positions than the L-buffer depth values. By this expedient, pixels outside the view port cannot include depth values between the L- and Z-buffer values; view port clipping is thus realized because no object to be displayed outside the view port is written.

The first technique, described in section 2(a) above, includes the condition that, to update pixels, the pixel must have been accessed when the boundary surface (FBP or BBP) was developed. Usually, to check the above, a flag is provided for each pixel and set to the value showing "accessed" when the boundary surface is developed. Therefore, view port clipping can be performed by setting the flag to the value showing "not accessed" for every pixel outside the view port immediately before an object to be displayed is developed into pixels.

b. Clipping to Outside of an Area

The outside of a convex three-dimensional polyhedral region is a concave region. If the number of buffers for storing depth values is more than the number of intersections between the line of sight and the boundary of the clipping region for each pixel as previously mentioned, clipping can be performed for the concave region in a manner similar to the procedure described in section 2. The boundary of the convex region intersects the line of sight a maximum of only two times. In this case, however, unlike clipping for the convex regions of section 2, buffers for depth values of rear intersections cannot be shared with normal Z-buffers. Of course, clipping can be performed by providing two equivalents of the L-buffer for each pixel and updating the data concerned only when the depth value of the data is nearer than the front value or farther than the back value. However, a method using only one Z-buffer and one L-buffer for each pixel is described below which minimizes the amount of hardware, although the method takes a little more time.

The following method uses the technique of section 2(a) as the basic technique to attain clipping for the region outside a convex three-dimensional region by executing the procedure twice, changing the values provided to the L- and Z-buffers for clipping. On the first execution, the BBPs of the convex three-dimensional region are developed to provide values to the L-buffers according to step 3 of the technique of section 2(a). That is, the procedure is executed by replacing the FBPs with the BBPs in step 3. The farthest value is provided to the Z-buffer for every pixel. If the farthest value is provided on initialization, the Z-buffer is not updated during step 3. The remaining operation is executed according to the technique of section 2(a).

On the second execution, the color buffer initialization in step 2 is not executed, thereby leaving the results of the first execution. In step 3, the nearest values are provided to the L-buffers, and the FBPs of the convex three-dimensional region are developed to provide values for the Z-buffers. In step 4, the operation is executed using the first two conditions, excluding condition c. With these changes, the second execution of the technique of section 2(a) is performed.

Figure 6A:
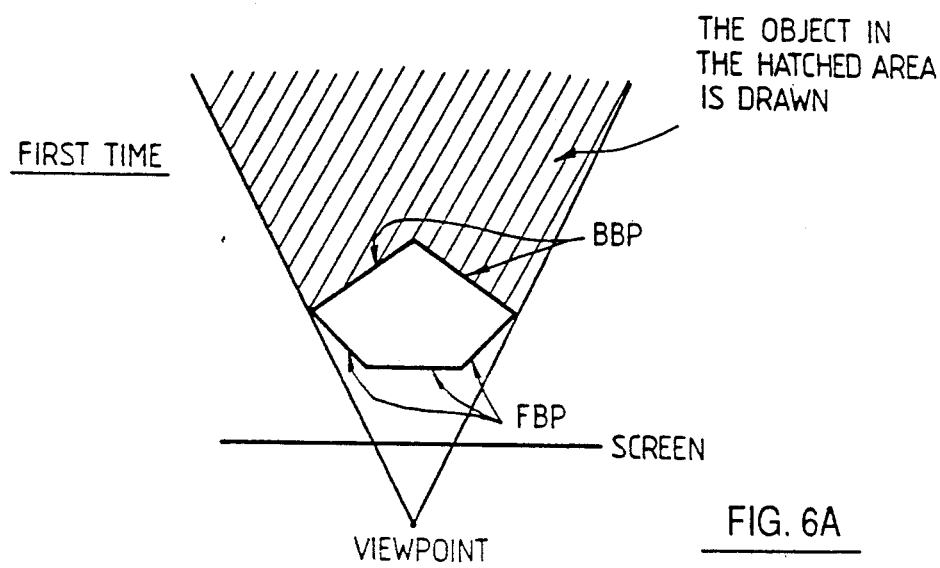
FIG. 6 is a view illustrating the clipping out of convex area.
Figure 6B:
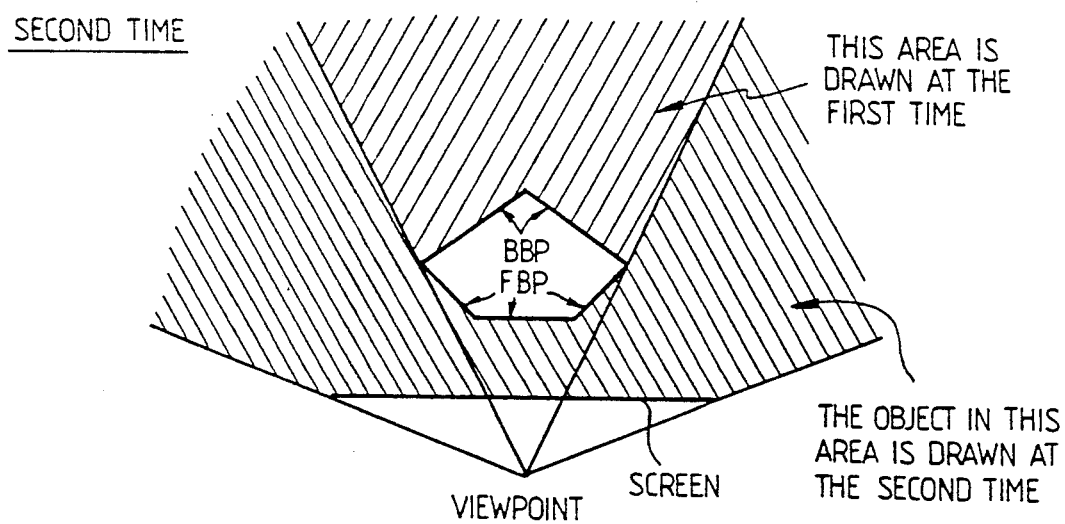
Figure 7A:
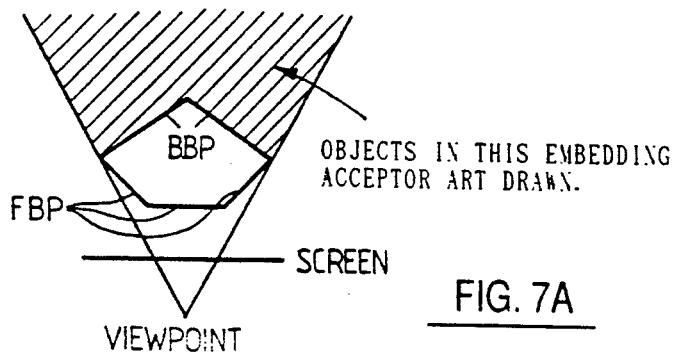
FIG. 7 is a view illustrating three-dimensional synthesis of images.
Figure 7B:
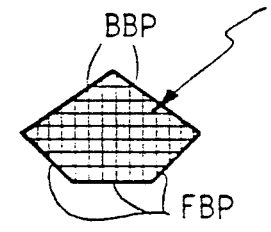
Figure 7B:
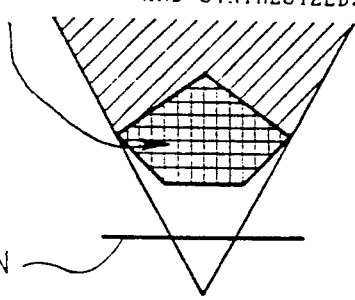
Figure 7C:
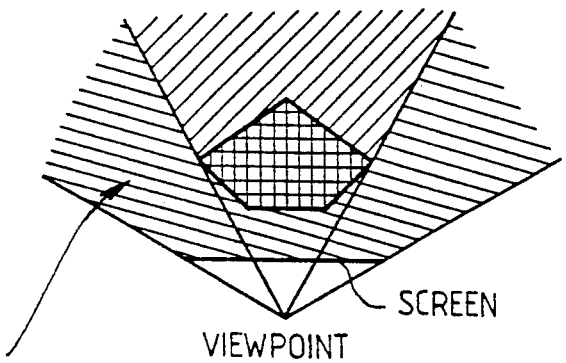

As shown in FIG. 6, the object behind the back boundary surfaces (BBPs) of the convex three-dimensional region is drawn on the first execution, and the object before the front boundary surfaces (FBPs) or in the region where the line of sight does not intersect the convex three-dimensional region is drawn on the second execution, and finally the clipping ends.

c. Three-Dimensional Synthesis of Images

When view port clipping is applied, three-dimensional image synthesis can be simply realized. The following describes a method used to generate an image made by three-dimensionally embedding a part of a three-dimensional model in a certain portion of another three-dimensional model. There is another method of separately generating several images together with depth values and synthesizing them while judging which image is visible using the depth value for each pixel. However, the following describes a method using only one set of buffers.

The technique of section 2(a) above is used for clipping an embedding region (however, the embedding region is restricted to a convex region) with itself used as a clipping region, and the above mentioned clipping technique for outside of a region is used for clipping a region to be embedded, with the outside region of the embedding region positioned at an embedding destination, used as a clipping region. Synthesis is completed by executing the procedure section 2(a) three times, modifying the procedure each time. On the first execution, the first half of the clipping procedure of section 3(b), for the outside region, that is, the first-time procedure, is executed to draw the object in the embedding destination model. On the second execution, the technique of section 2(a) is executed without initializing the color buffers, using the embedding region as a clipping region to draw the object in the model including the embedding portion. In this case, however, coordinate conversion is made beforehand so that the boundary surfaces of the clipping region will be matched with the first execution on the screen. On the third execution, the second half of the clipping procedure of section 3(b) for the outside region, that is, the second-time procedure, is executed to draw the object in the embedding destination model. By this procedure, the three-dimensionally synthesized image can be generated as shown in FIG. 7.

OUTLINE OF THE SYSTEM

Figure 8:
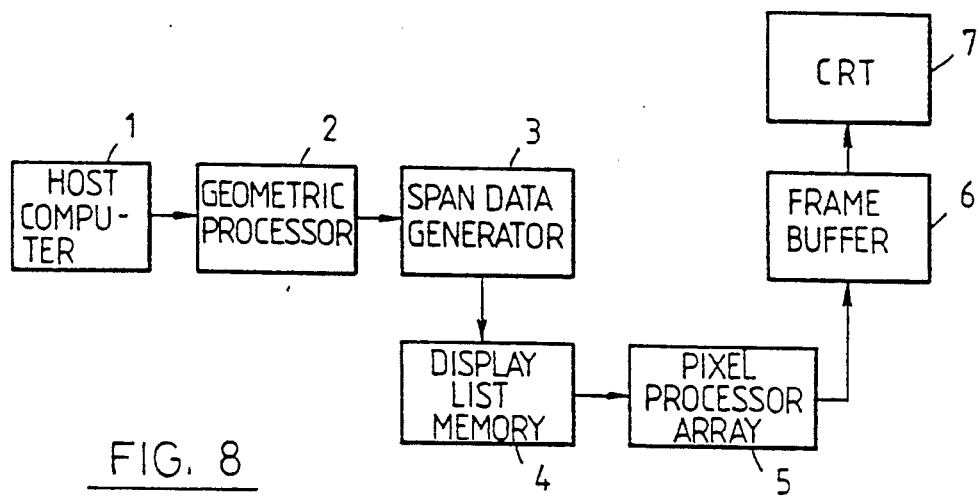
FIG. 8 is a schematic block diagram showing a system configuration of the system in one embodiment of this invention.

FIG. 8 shows the system configuration of the embodiment of the invention. Though the following describes a system made by embodying the main parts with hardware, it is also possible to implement the techniques described in section 2 above with software. In the system, the number of Z- and L-buffers is limited to the number of pixels for one scan line by combining the scan line method with the techniques described in section 2. In addition, the development of a span (the portion of a polygon occupying a scan line) into pixels is made by the pixel processor array, in which the number of pixel processors corresponds to the number of pixels on the scan line, at a high speed in parallel. The basic functions of the image display unit include hidden-surface removal, Gouraud shading and three-dimensional clipping. The following system corresponds to both techniques (1) and (2).

Figure 9:
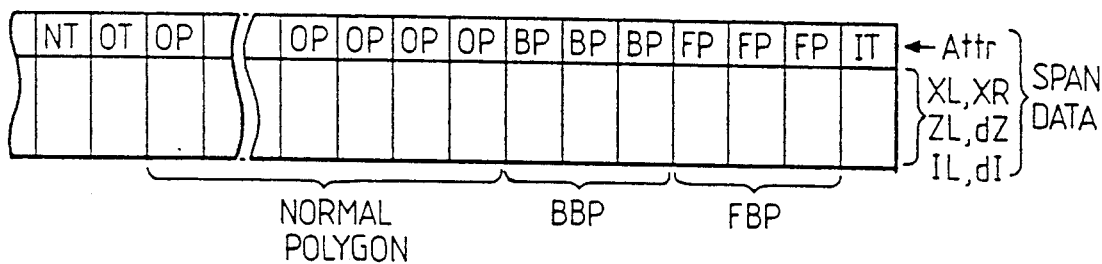
FIG. 9 is a diagram showing the input sequence of span data to a pixel processor array.

A graphics application is executed on the host computer 1, and the geometric processor 2 is provided with the polygon data represented by world coordinates, that is, the coordinates and color information of each apex of the polygons, and data for the front boundary surfaces (FBPs) and the back boundary surfaces (BBPs), that is, the coordinates of each apex of the boundary surfaces. The geometric processor 2 converts the world coordinates into the coordinates and depth values on the screen through perspective conversion and scale conversion. Also for the technique of section 2(b), the processor 2 converts FBPs and BBPs into EFBPs and EBBPs respectively. The span data generator 3 generates span data for each scan line occupied by the polygon from the polygon data on the screen through such techniques as the DDA (Digital Differential Analyzer) technique. The pixel processor array 5 processes span data for each scan line in batch according to the scan line method. Therefore, the span data generator 3 uses the packet sort method so that span data will be collected for each scan line when outputting span data to the display list memory 4. That is, the display list memory 4 is used for a work area to collect span data for each scan line. Span data collected for each scan line is inputted to the pixel processor array 5 through one scan line in the order of span data for FBPs, span data for BBPs, and span data for all display objects (see FIG. 9). The pixel processor array 5 processes span data according to the technique described in section 2. After the processing of span data for one scan line is completed, color information for each pixel of the results is output to the frame buffer 6.

The pixel processor array 5 successively executes the scan line processing. When the processing for one screen ends, the image is completed.

The following is a more detailed description of the processing by the pixel processor array 5, which is the core of the processing. First, span data and its notation are described. Because processing is performed for each scan line, the following are used for the span data on a certain scan line of each polygon;

(Attr, XL, XR, ZL, dZ, IL, dI)

XL and XR represent the X-coordinates at the ends of the span. In this case, they are called the left end and right end, respectively, for convenience. ZL and IL represent a depth value and brightness value, respectively. (Although three brightness values corresponding to primary colors are necessary for color display, only one value is used in this case.) The quantities dZ and dI represent the variation in depth value and brightness value, respectively (the difference is constant because of linear interpolation), for each deviation of one pixel from the XL to the XR end of the scan line. Therefore, span-data development is performed by adding dZ and dI to the depth value and brightness value, respectively, of every pixel from XL to XR. The attribute term (Attr) is included to distinguish FBPs and BBPs from normal polygons or to add a little information for initialization or output of the pixel processor array. The following are values (attributes) to be actually used for Attr:

OP: Normal polygon span (ordinary polygon) out of the boundary surface of the clipping area.

FP: Boundary surface at the front of the clipping area (FBP).

BP: Boundary surface at the back of the clipping area (BBP).

IT: Initialization command to the pixel processor (Initialize Token).

OT: Output command to the pixel processor (Output Token).

NT: Non-operation command to the pixel processor (No operation Token).

The EFBPs and EBBPs used for the technique of section 2(a) are shared by the FP and BP, respectively. For span data with Attr values of IT, OT, or NT, factors of other span data have no meaning. For span data with Attr values of FP or BP, IL and dI have no meaning. Data is input to and processed by the pixel processor array 5 for each scan line in the sequence shown in FIG. 9.

Figure 10:
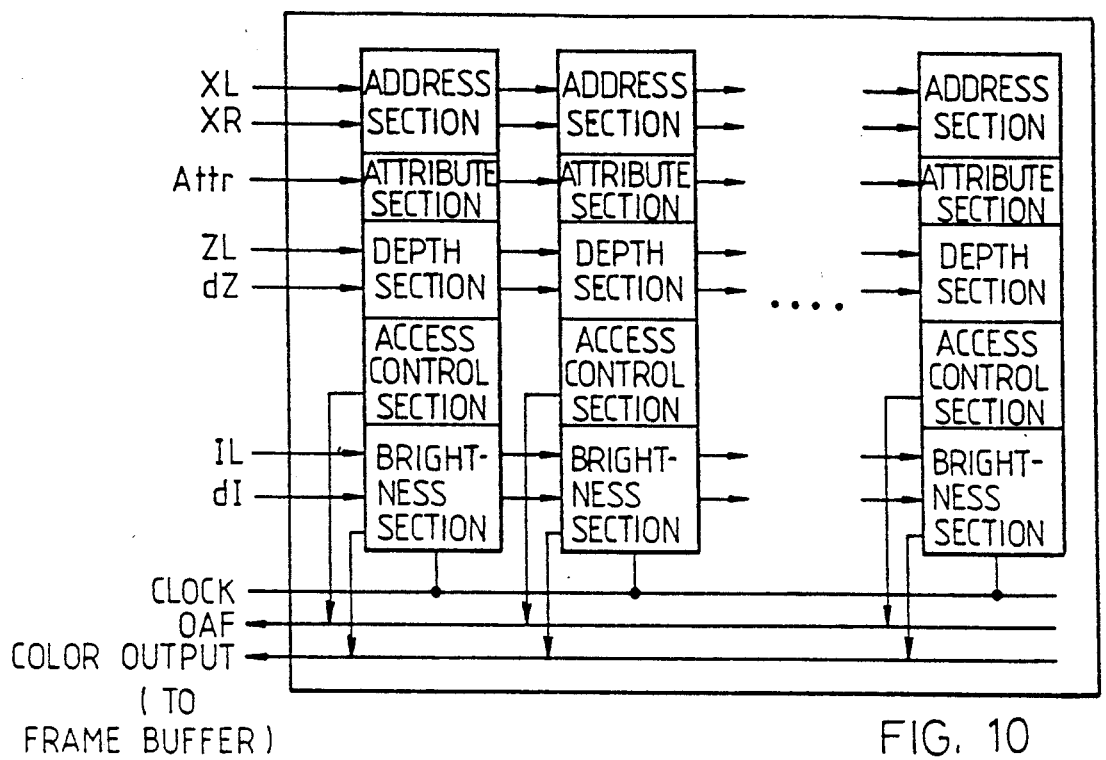
FIG. 10 is a diagram showing the pixel processor array configuration.

The following describes the pixel processor array. FIG. 10 shows the pixel processor array configuration and FIG. 11 the individual pixel processor configuration. The pixel processor array has a structure in which the pixel processors are connected in accordance with the number of pixels (e.g. 1,024 pixels) on the scan line. The pixel processor receives data from the pixel processor of the preceding stage and gives it to that of the subsequent stage. Every pixel processor operates in parallel, while being synchronized with the same clock. This makes it possible to input one span data value to the pixel processor array for each clock.

Figure 11:
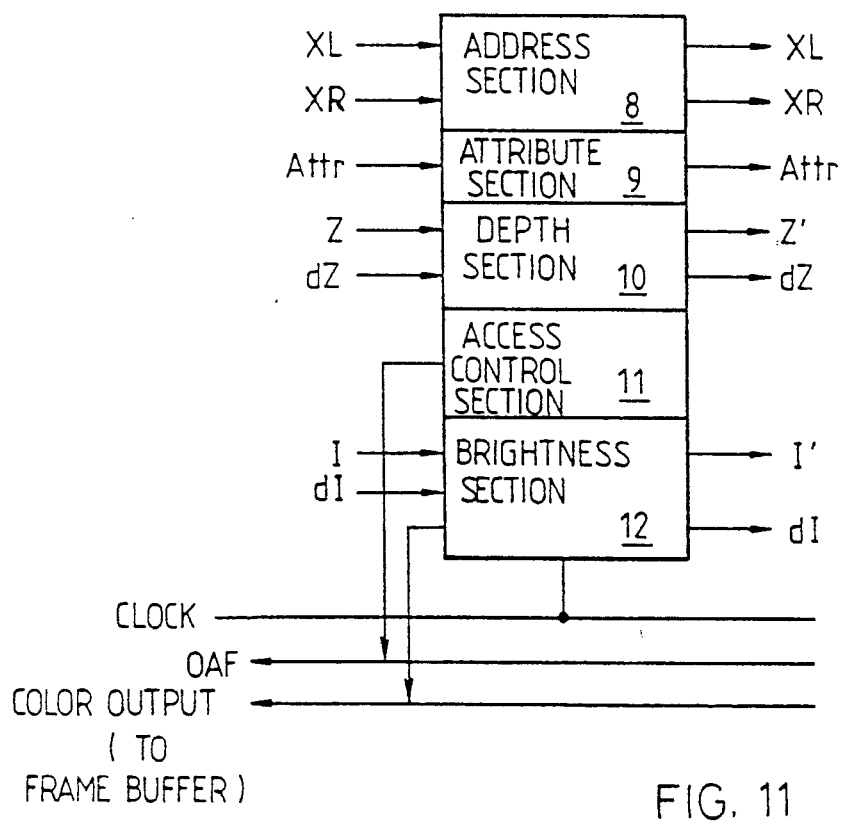
FIG. 11 is a diagram showing the pixel processor configuration.

The following describes the pixel processor of FIG. 11.

The address section 8 has a proper identification number (pixel_ID) for each pixel processor and the number corresponds to the X-coordinate on the scan line. That is, the pixel processor with the pixel_ID No. 0 is the pixel processor in charge of the first pixel (the left end in this case) on the scan line and the pixel processor with the pixel_ID No. 100 is in charge of 101st pixel.

Assuming that the scan line consists of 1,024 pixels, the pixel_ID numbers range between 0 and 1,023. The address section 8 checks if the pixel related to the address section 8 is included between XL and XR of input scan data, using the above pixel_ID numbers. That is, it checks the condition shown below:

XL<pixel_ID<XR

The address section directly outputs the input values of XL and XR to the pixel processor of the subsequent stage.

The attribute section 9 analyzes the Attr part of input span data to control the operation of other parts of the pixel processor, and directly outputs the input Attr values to the subsequent stage.

The depth section 10, which has the Z- and L-buffers to check the conditions related to depth values, controls the Z- and L-buffers and interpolates depth values. The depth section 10 determines the checking of the condition related to depth values and control of the Z- and L-buffers for each Attr value because the condition checked depends on the Attr value. Assuming the present values in the Z- and L-buffers to be Z_buf and Z_L, respectively, and the depth value of span data to be input to the pixel processor as Z:

(1) For Attr=OT or NT
   The depth section executes no operation.
(2) For Attr=IT
   The depth section initializes the Z- and L-buffers.
(3) For Attr=FP
   The depth section checks the condition Z>Z_L and updates the L-buffer with Z if the condition is met.
(4) For Attr=BP
   The depth section checks the condition Z<Z_buf and updates the Z-buffer with Z if the condition is met.
(5) For Attr=OP
   The depth section checks the condition Z_L<Z<Z_buf and updates the Z-buffer with Z if the condition is met.

For the interpolation of depth values, assuming the variation of the depth value for each pixel of input span data to be dZ, the depth section 10 directly outputs Z as the depth value to the pixel processor of the subsequent stage, unless the condition checked by the address section is met, and outputs Z+dZ to the subsequent stage if the condition is met. It directly outputs dZ to the subsequent stage as the variation of depth values, regardless of conditions.

The access control section 11 has the following two flags: BAF (Boundary polygon Access Flag) and OAF (Ordinary polygon Access Flag). The BAF is the flag used to check the condition in Item c of step 4 in the technique of section 2(a) and the OAF is the flag used to realize techniques (b) and (c) in section 3. The access control section 11 controls the BAF and OAF. Because the operation depends on Attr values, it is described for each value as follows:

(1) For Attr=NT
   The control section executes no operation.
(2) For Attr=IT
   The control section initializes the BAF and OAF.
(3) For Attr=OT
   The control section outputs the OAF to the outside of the array.
(4) For Attr=FP or BP
   The control section outputs "1" to the BAF if the address section condition is met.
(5) For Attr=OP
   The control section outputs "1" to the OAF if the address- and depth-section conditions are simultaneously met and BAF=1.

The following describes how to use the OAF. Because the pixel processor array is based on the scan line method, it is difficult to implement techniques such as techniques (b) and (c) of section 3 that involve repeatedly executing the technique of section 2(a) on the pixel processor array. Therefore, the final image is synthesized in the frame buffer to avoid difficulties. That is, to synthesize images, only pixels with an OAF of 1 are updated in the frame buffer according to the OAF when outputting the brightness value from the pixel processor array 5 to the frame buffer 6.

The brightness section 12, which has the color buffer (the memory to store three brightness values corresponding to primary colors in this case), controls the color buffer and interpolates the brightness value of span data. Because the control of the color buffer depends on Attr values, it is described for each value. Assuming the brightness value of span data to be I (the symbol representing three values);

(1) For Attr=NT, FP or BP
   The brightness section executes no operation.
(2) For Attr=IT
   The section initializes the color buffer.
(3) For Attr=OT
   The section outputs values for the color buffer to the outside.
(4) For Attr=OP
   The section updates the color buffer with I if the address- and depth-section conditions are met and BAF=1.

For the interpolation of brightness values, assuming the variation of the brightness value for each pixel of input span data to be dI, the brightness section 12 directly outputs I as the brightness value to the pixel processor of the subsequent stage unless the condition checked by the address section is met, and outputs I+dI to the subsequent stage if the condition is met. It directly outputs dI to the subsequent stage as the variation of brightness values, regardless of conditions.

Color buffer values outputted to the outside of the array are written in the pixels corresponding to the frame buffer 6 and an image is generated.

ADVANTAGES OF THE INVENTION

As mentioned above, this invention makes it possible to quickly generate images with minimal calculation and with an easily realizable hardware implementation like the system shown in the embodiment, because clipping for any three-dimensional region can be made merely by comparing depth values with values in buffers when developing a display object into pixels.

While the invention has been particularly shown and described with reference to preferred embodiments thereof, it will be understood by those skilled in the art that various changes in form and details may be made therein without departing from the spirit and scope of the invention.

What is claimed is:

1. Image display apparatus comprising:
   first buffers for storing first depth values for pixel positions on the front boundary surface of a clipping region, each said pixel position having a corresponding first buffer for storing said first depth value, which may differ from the first depth values stored in the other first buffers;
   second buffers for storing second depth values for said pixel positions on the back boundary surface of said clipping region, each said pixel position having a corresponding second buffer for storing said second depth value, which may differ from the second depth values stored in the other second buffers;
   means for generating a depth value for a pixel position on an object to be displayed;
   means for comparing said generated depth value with the first and second depth values stored in the first and second buffers corresponding to said pixel position; and
   means for determining whether said pixel position on said object to be displayed is within said clipping region in accordance with the results of said comparison by said comparing means.

2. Image display apparatus comprising:

pixel data buffers for storing previously generated pixel data for each pixel position on a screen, each said pixel position having a corresponding pixel data buffer;

first buffers for storing first depth values for said pixel positions on the front boundary surface of a clipping region, each said pixel position having a corresponding first buffer for storing said first depth value, which may differ from the first depth values stored in the other first buffers;

second buffers for storing second depth values for said pixel positions on the back boundary surface of said clipping region, each said pixel position having a corresponding second buffer for storing said second depth value, which may differ from the second depth values stored in the other second buffers;

means for generating new pixel data and a depth value for a pixel position on an object to be displayed;

means for replacing the second depth value stored in the corresponding second buffer with said generated depth value and replacing the previously generated pixel data stored in the corresponding pixel data buffer with said new pixel data when said generated depth value represents a distance from the viewpoint that is larger than that represented by the first depth value stored in the corresponding first buffer and smaller than that represented by the second depth value stored in the corresponding second buffer.

3. Apparatus as in claim 2, further comprising a flag buffer for indicating for each pixel position whether a first or second depth value on a boundary surface of the clipping region has been stored in the corresponding first or second buffer, said second depth value and previously generated pixel data being replaced only if said flag indicates that a first or second depth value on a boundary surface of the clipping region has been stored in the corresponding first or second buffer.

4. An image display method including the steps of:

storing first depth values for pixel positions on the front boundary surface of a clipping region in first buffers corresponding to said pixel positions, each said pixel position having a corresponding first buffer for storing said first depth value, which may differ from the first depth values stored in the other first buffers;

storing second depth values for said pixel positions on the back boundary surface of said clipping region in second buffers corresponding to said pixel positions, each said pixel position having a corresponding second buffer for storing said second depth value, which may differ from the second depth values stored in the other second buffers;

generating a depth value for a pixel position on an object to be displayed;

comparing said generated depth value with the first and second depth values stored in the first and second buffers corresponding to said pixel position; and determining whether said pixel position on said object to be displayed is within said clipping region in accordance with the results of said comparison.

5. A method as in claim 4 in which said steps are performed for each of a plurality of pixel positions on a screen.

6. A method as in claim 4 in which said clipping region is a polyhedron, said front boundary surface comprising at least one front-facing boundary polygon facing the viewpoint, said back boundary surface comprising at least one back-facing boundary surface facing away from the viewpoint.

7. A method as in claim 6 including the step of projecting a view port onto the planes containing said boundary polygons to form extended boundary polygons.

8. A method as in claim 4 including the steps of:
storing previously generated pixel data for said pixel position in a pixel data buffer;

generating new pixel data for said pixel position on said object to be displayed;

replacing the second depth value stored in the corresponding second buffer with said generated depth value and replacing the previously generated pixel data stored in said pixel data buffer with said new pixel data when said generated depth value represents a distance from the viewpoint that is larger than that represented by the first depth value stored in said first buffer and smaller than that represented by the second depth value stored in said second buffer.

* * * * *